United States Patent
Cheston et al.

(10) Patent No.: US 6,405,259 B1
(45) Date of Patent: Jun. 11, 2002

(54) DATA PROCESSING SYSTEM AND METHOD FOR TRANSMISSION OF A NETWORK PACKET SPECIFYING A GROUP IDENTIFIER IDENTIFYING A SELECTED PLURALITY OF CLIENTS

(75) Inventors: Richard W. Cheston, Morrisville; Daryl C. Cromer; Dhruv M. Desai, both of Cary; Brandon J. Ellison, Raleigh; Howard J. Locker, Cary; James Peter Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/207,888

(22) Filed: Dec. 8, 1998

(51) Int. Cl.[7] .............................................. G06F 15/16
(52) U.S. Cl. ...................................... 709/245; 709/223
(58) Field of Search .................................. 709/223, 245

(56) References Cited

U.S. PATENT DOCUMENTS

| | | | | |
|---|---|---|---|---|
| 5,835,723 A | * | 11/1998 | Andrews et al. | 395/200.56 |
| 5,893,091 A | * | 4/1999 | Hunt et al. | 707/3 |
| 6,078,954 A | * | 6/2000 | Lakey et al. | 709/223 |
| 6,126,548 A | * | 10/2000 | Jacobs et al. | 463/42 |
| 6,151,696 A | * | 11/2000 | Miller et al. | 714/748 |

* cited by examiner

Primary Examiner—John A. Follansbee
(74) Attorney, Agent, or Firm—Bracewell & Patterson, LLP; J. Bruce Schelkopf

(57) ABSTRACT

A method and system are disclosed for transmitting a network packet which identifies only selected ones of a plurality of client computer systems. The client computer systems are coupled to a server computer system to form a network. A logical group is specified which includes only a first plurality of the plurality of client computer systems by specifying one of a plurality of group identifiers. A network packet is then transmitted utilizing the network to the logical group. The network packet includes the group identifier which identifies the logical group, wherein only the logical group are the intended recipients of the packet.

10 Claims, 7 Drawing Sheets

DATA PROCESSING SYSTEM AND METHOD FOR TRANSMISSION OF A NETWORK PACKET SPECIFYING A GROUP IDENTIFIER IDENTIFYING A SELECTED PLURALITY OF CLIENTS

CROSS-REFERENCE TO RELATED APPLICATIONS

The present invention is related to the subject matter of co-pending patent application Ser. No. 09/024,231 entitled "FULL TIME NETWORK AUXILIARY PROCESSOR FOR A NETWORK CONNECTED PC" filed on Feb. 17, 1998, assigned to the assignee herein named and incorporated herein by reference, now U.S. Pat. No. 6,266,696.

BACKGROUND OF THE INVENTION

1. Field of the Invention

The present invention relates in general to data processing systems and, in particular, to a data processing system and method including a server and client computer system coupled together utilizing a local area network. Still more particularly, the present invention relates to a data processing system and method including a server and client computer system coupled together utilizing a local area network for transmitting a network packet having a group identifier which identifies only selected clients.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC series, Aptiva series, and Thinkpad series.

With PCs being increasingly connected into networks to allow transfers of data among computers to occur, more operations such as maintenance, updating of applications, and data collections are occurring over the network. Computer networks are also becoming essential to their user. It is desirable minimize loss of productivity by increasing availability of network resources.

Significant costs are associated with deploying and maintaining computer systems in large corporate environments. In particular, large costs may be involved in tracking and maintaining each computer system utilizing a particular network.

Computer systems which include a network controller have a particular network address. The network address is defined by the hardware included within the controller as it was configured during manufacturing. The controller addresses are randomly assigned. Although the address may be utilized to identify a particular controller, the address provides no information about the type of system, type of operating system, or other system characteristics.

It may be costly to maintain a typical network having a variety of system types coupled to the network. For example, a network administrator may need to transmit a particular network packet to only those computer systems which are a particular system type. The network administrator has no method for transmitting such a packet without manually checking each system's type, or querying each system.

Therefore a need exists for a data processing system and method for transmitting a network packet which includes a group identifier identifying only selected ones of a plurality of client computer systems.

SUMMARY OF THE INVENTION

A method and system are disclosed for transmitting a network packet which identifies only selected ones of a plurality of client computer systems. The client computer systems are coupled to a server computer system to form a network. A logical group is specified which includes only a first plurality of the plurality of client computer systems by specifying one of a plurality of group identifiers. A network packet is then transmitted utilizing the network to the logical group. The network packet includes the group identifier which identifies the logical group, wherein only the logical group are the intended recipients of the packet.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–7 of the drawings, like numerals being used for like and corresponding parts of the accompanying drawings.

The present invention is a method and system for transmitting a network packet including one of a plurality of group identifiers which identifies only selected ones of a plurality of client computer systems. The plurality of client computer systems are coupled to a server computer system utilizing a network.

A network packet is transmitted which includes a group identifier. The group identifier identifies a logical group of the plurality of client computer systems. The plurality of client computer systems may be grouped into logical groups. A single client computer system may be included within several or all of the logical groups. The logical groups may include a logical workgroup, a group of client computer systems which utilize a particular system type, a particular protocol type, or which utilize a particular operating system version.

In this manner, a subset of the plurality of client computer systems are identified as the intended recipients of a particular network packet. The subset is identified as a particular logical group of client computer systems. The network packet then includes the logical workgroup as the group identifier.

A filter included within each client computer is capable of being programmed to pass only selected network packets. For example, a filter included within a particular client computer system may be programmed to pass only those network packets which include group identifiers which identify the logical workgroup in which the client is included, the operating system or the protocol type the particular client utilizes, or the system type of the client.

When the network packet is transmitted, it is received by the network controller included within each client computer system. Thereafter, a filter included within the network controller filters the packet according to the manner in which the filter has been programmed. Packets which include a group identifier which identifies either this particular client, the logical workgroup in which the client is included, the operating system or the protocol type the particular client utilizes, or the system type of the client will be passed by the filter to the client computer system for further processing. All other packets will be ignored.

Figure 1:
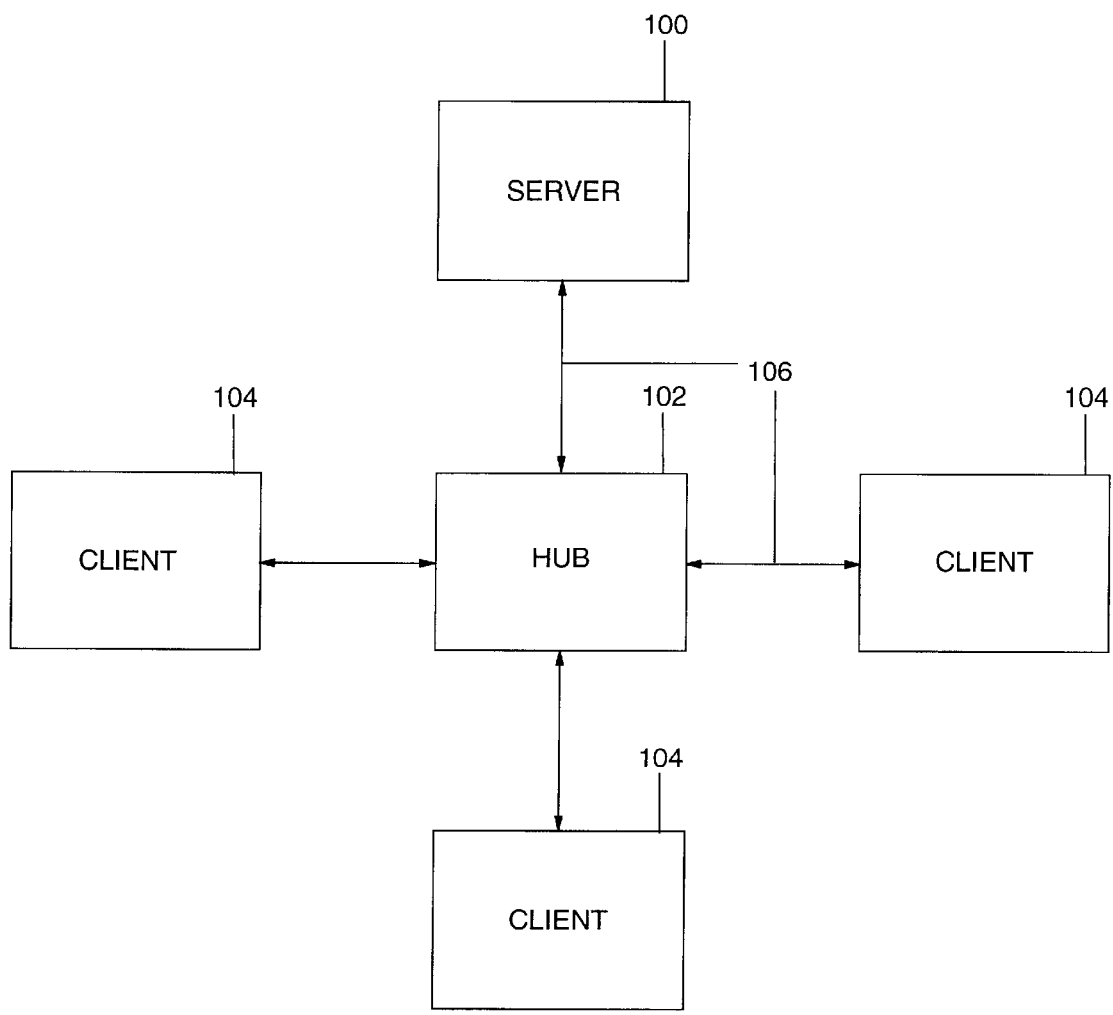
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks may be utilized to implement the invention.

The term "network" includes any type of data communications channel, such as an Ethernet network, token ring, or X.10 or X.25. Those skilled in the art will recognize that the invention described herein may be implemented utilizing any type of data communications channel. However, the preferred embodiment is implemented utilizing an Ethernet network.

Figure 2:
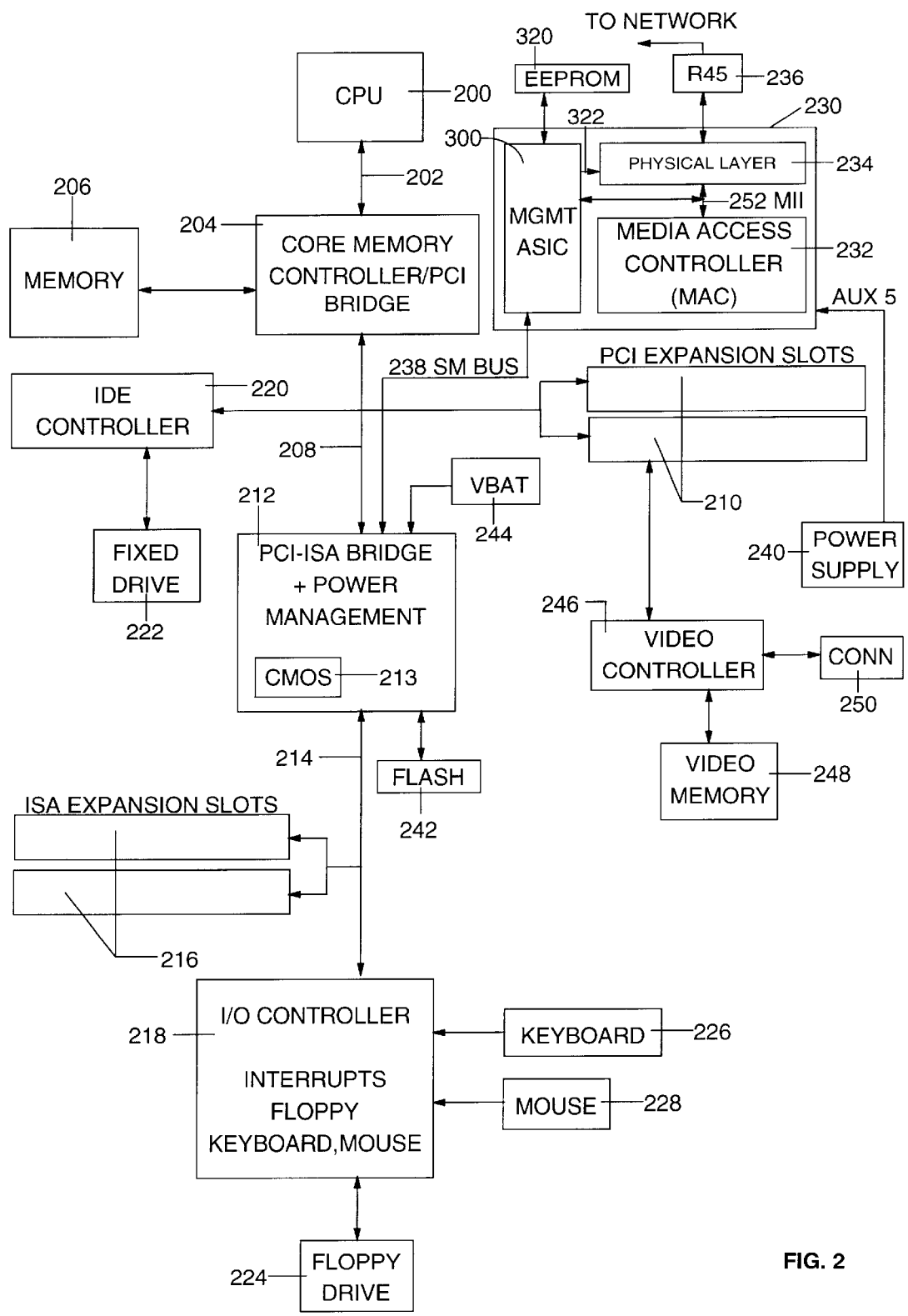
FIG. 2 depicts a more detailed pictorial representation of a client computer system in accordance with the method and system of the present invention.

FIG. 2 illustrates a pictorial representation of a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes storage 213, which is preferably implemented utilizing CMOS storage, that holds the BIOS settings. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 204 is supplied power from battery 244 to prevent loss of configuration data in storage 213.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a power supply 240 which supplies full normal system power, and has an auxiliary power main AUX 5 which supplies full time power to the power management logic 212 and to the network adapter 230. This enables client 104 to respond to a wakeup signal from network adapter 230. In response to a receipt of the wakeup signal, power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals-transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a service processor, or logic module, 300 coupled to the MII bus 252 between physical layer 234 and MAC 232. Service processor 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire, low-speed serial bus used to interconnect management and monitoring devices. With the trickle power supplied by signal AUX 5 from power supply 240, ASIC 300 is preferably powered full time. Micro-controller 302 (shown in FIG. 3) included within ASIC 300 is coupled to bridge controller 212 via the System Management (SM) bus 238 through SM bus interface 316. This provides a path to allow software running on client 104 to access ASIC and EEPROM 320.

Figure 3:
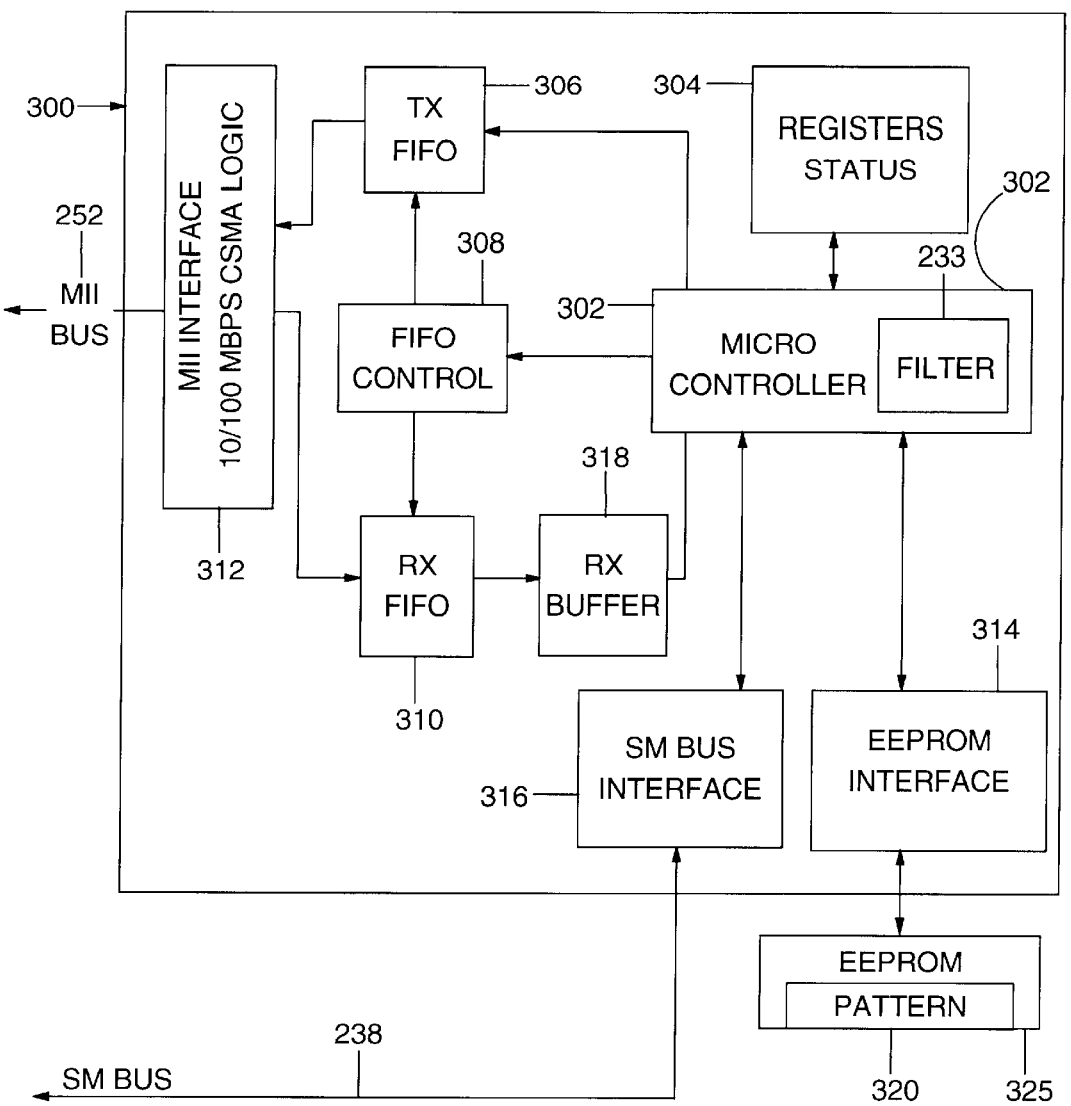
FIG. 3 illustrates a pictorial representation of a special purpose processing unit which is included within a network adapter included within a client computer system in accordance with the method and system of the present invention.

FIG. 3 illustrates a pictorial representation of management ASIC 300 which is included within a network adapter 230 included within a client computer system 104 in accordance with the method and system of the present invention. ASIC 300 includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests from software running on client 104 to access register status 304 or access EEPROM 320. Signals are received from the MII bus 252 by interface unit 312 and passed to RX FIFO 310.

Micro-controller 302 accesses EEPROM 320 through EEPROM interface 314 to obtain values to create network packets such as source and destination MAC addresses, IP protocol information, authentication headers, and Universal Data Packet headers. Further, EEPROM 320 retains the Universal Unique Identifier (UUID). EEPROM 320 may also include a predefined data pattern 325 which is utilized as described herein to filter received network packets.

Micro-controller 302 also includes a filter 233. Filter 233 is capable of being programmed to pass only selected network packets. Filter 233 compares a received packet to pattern 325. Network packets which match pattern 325 will be passed by waking client 104. Preferably, filter 233 is implemented utilizing a pattern match. Filter 233 may be programmed to pass only those network packets including a particular group identifier. The group identifier is a pattern identifying a particular logical group, such as a logical workgroup, a group of computer systems implemented utilizing a particular system type, a group of computer systems executing a particular version of an operating system, or a particular protocol.

Figure 4:
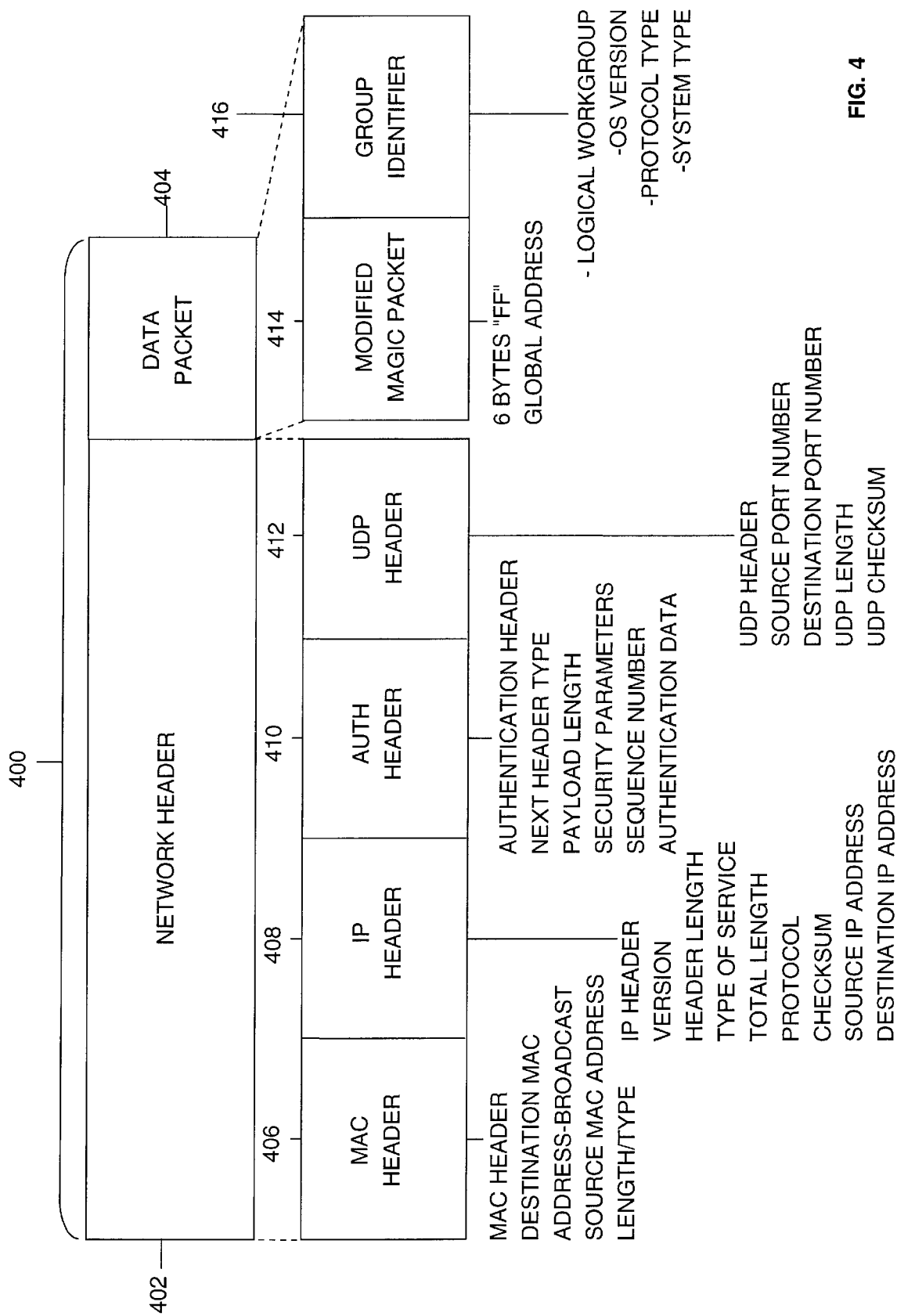
FIG. 4 illustrates a pictorial representation of a network packet, including a network header and a data packet, which may be transmitted by a server computer system over the network in accordance with the method and system of the present invention.

FIG. 4 illustrates a pictorial representation of a network packet 400, including a network header 402 and a data packet 404, which may be transmitted by a server computer system over the network in accordance with the method and system of the present invention. Each network packet 400 includes a network header 402 and a data packet 404.

Network header 402 includes a MAC header 406, IP header 408, authentication header 410, and UDP header 412 which are all known in the art to provide addresses, identifiers, and other information for assuring correct transfer of the packet. In the present invention, MAC header 406 includes a destination MAC address which specifies all MACs on the network such that network packet 400 could, but not necessarily, be received by all clients. Data packet 404 includes the information content to be transferred.

Data packet 404 includes modified magic packet 414 and a group identifier 416. Modified magic packet 414 is a specialized type of packet. The content of packet 414 is six bytes of "FF" followed by a global MAC address. Modified magic packet 414 is a management packet which does not include standard network data.

Group identifier 416 identifies the particular logical group which is the intended recipient of network packet 400. For example, the intended recipient may be a particular group of clients which are associated with a particular logical workgroup such as an engineering workgroup, a group of clients which utilize a particular operating system version, a group of clients which utilize a particular protocol type, or a group of clients which a particular system type.

The global MAC address is an address which specifies all MACs which are coupled to the network. The global address may be implemented utilizing a default MAC address, a MAC address used for broadcast, or any predefined unique bit pattern.

Although the preferred embodiment utilizes a modified magic packet, the present invention could be implemented utilizing any predetermined data pattern as the "magic" packet portion, i.e. the six bytes of "FF". Any predefined data pattern could be utilized to indicate to each client that the information following the "magic" packet portion of the network packet includes one of a plurality of group identifiers which is to be filtered as further described below.

When the modified magic packet includes a global MAC address, all MACs included in all client computer systems coupled to the network will process the network packet. When modified magic packet 414 is detected utilizing the six bytes of "FF", or other predetermined data pattern, each MAC 232 included within each client will receive modified magic packet 414.

For example, if a particular client's filter is programmed to pass only a particular group identifier associated with a particular logical group, the ASIC included within this client will determine, utilizing the filter, whether the packet includes a group identifier associated with the logical group. If the packet does include the particular group identifier associated with the particular logical group, the client will be powered-on. Thereafter the client may boot locally, or boot to the server. Alternatively, the server may stored a status in ASIC 300 which could be utilized by an application executing within the client which describes further action the client is to take. However, if the packet does not include a group identifier associated with the particular logical group, the packet will be ignored.

When a network packet 400 is received by client 104, it is received by physical layer 234 and placed on the MII bus 252. When network packet 400 includes modified magic packet 414, MAC 232 detects that it includes modified magic packet 414, and then MAC 232 ignores network packet 400.

ASIC 300 also receives network packet 400 utilizing the MII interface 312. Data packet 404 is transferred to RX FIFO 310 and then to RX buffer 318.

Figure 5:
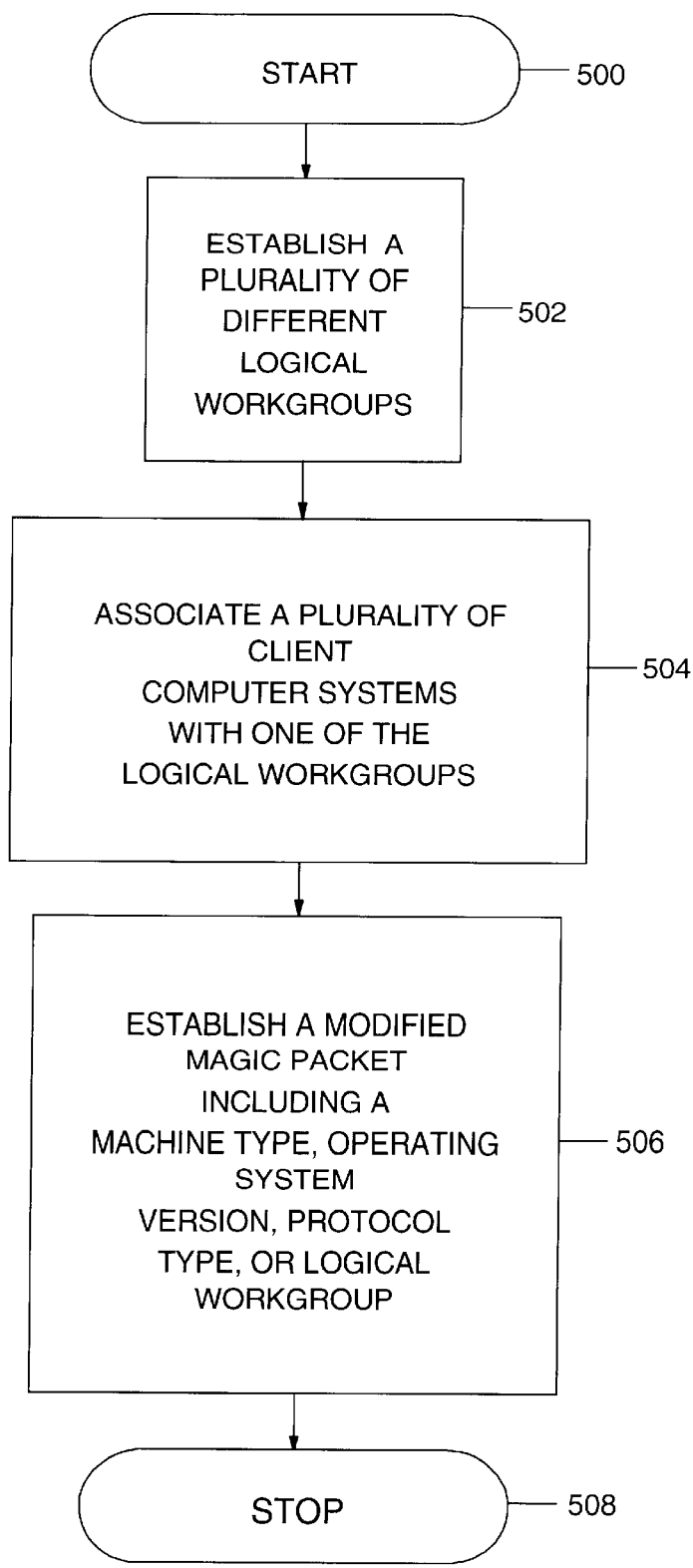
FIG. 5 depicts a high level flow chart which illustrates establishing logical workgroups, and establishing a modifies magic packet in accordance with the method and system of the present invention.

FIG. 5 depicts a high level flow chart which illustrates establishing a modified magic packet and logical groups in accordance with the method and system of the present invention. The process starts as depicted by block 500 and thereafter passes to block 502 which illustrates establishing a plurality of different logical workgroups. For example, the engineering department could be divided into multiple logical workgroups, ENG1, ENG2, ENG3, etc., while the accounting department, finance department, and other departments each are a different logical workgroup. Next, block 504 depicts associating a plurality of client computer systems with one of the logical workgroups. For example, each client computer system within the first engineering workgroup would be associated with ENG1, while the accounting department's client computer systems are associated with another logical workgroup, ACNT. Thereafter, block 506 illustrates establishing a modified magic packet. The modified magic packet includes six bytes of "FF" hexadecimal, and either a system type, operating system version, protocol type, or an identification of one of the logical workgroups. The process then terminates as depicted by block 508.

Figure 6:
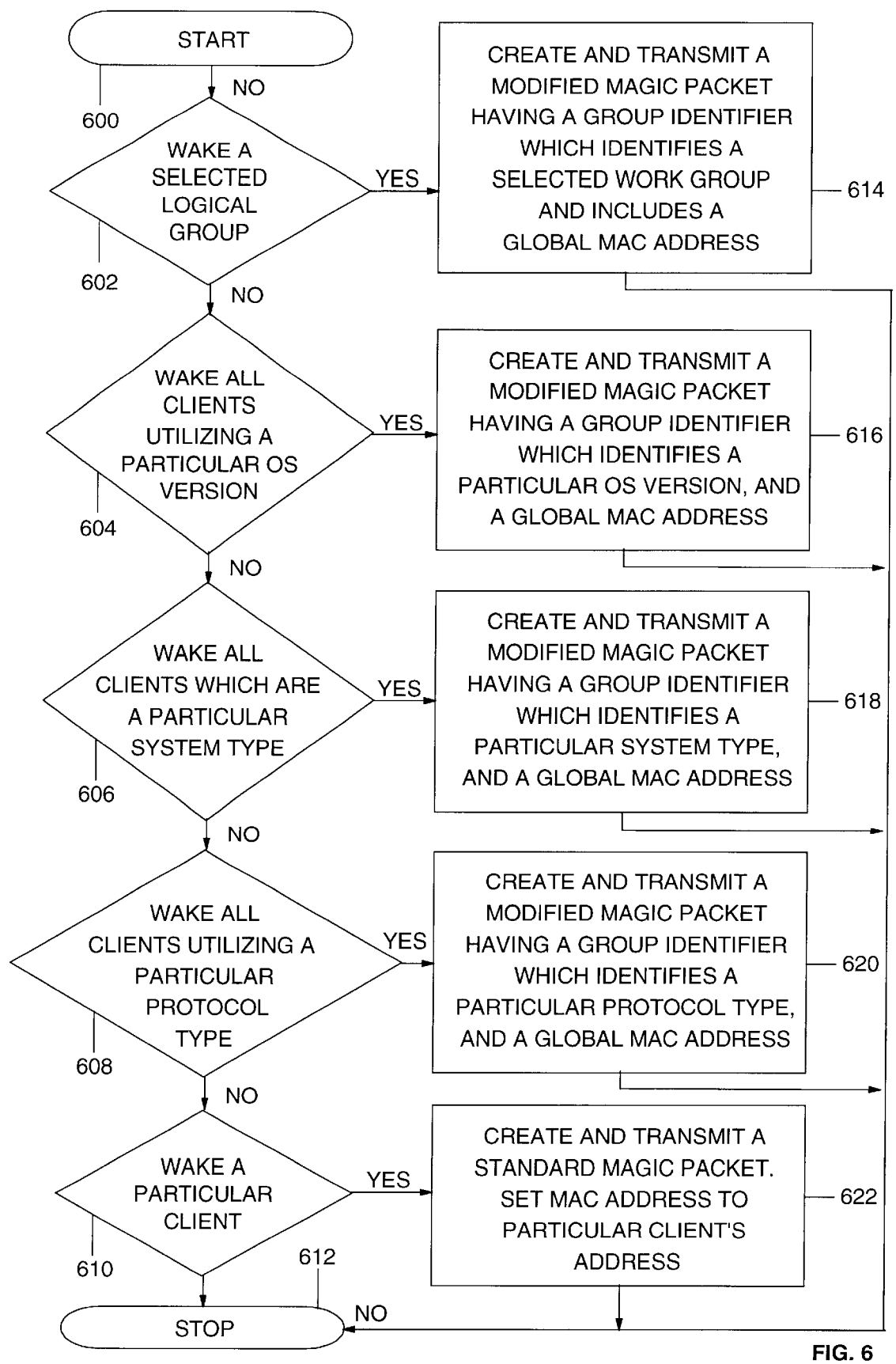
FIG. 6 illustrates a high level flow chart which depicts a client computer system receiving a network packet having a group identifier which identifies only selected clients in accordance with the present invention.

FIG. 6 illustrates a high level flow chart depicting a server computer system creating and transmitting a modified magic packet having a group identifier which identifies only selected client computer systems in accordance with the method and system of the present invention. The process starts as depicted by block 600 and thereafter passes to block 602 which illustrates a determination of whether or not the server will wake a selected logical workgroup. If a determination is made that the server will not wake a selected logical workgroup, the process passes to block 604 which depicts a determination of whether or not the server will wake all clients which utilize a particular operating system version. If a determination is made that the server will not wake all clients which utilize a particular operating system version, the process passes to block 606 which illustrates a determination of whether or not the server will wake all clients which are a particular system type. If a determination is made that the server will not wake all clients which are a particular system type, the process passes to block 608 which depicts a determination of whether or not the server will wake all clients which are utilizing a particular protocol type. If a determination is made that the server will not wake all clients which are utilizing a particular protocol type, the process passes to block 610 which illustrates a determination of whether or not the server will wake a particular client. If a determination is made that the server will not wake a particular client, the process terminates as depicted by block 612.

Referring again to block 602, if a determination is made that the server will wake a selected logical workgroup, the process passes to block 614 which depicts a creation and transmission of a modified magic packet having a group identifier which identifies a selected workgroup, and a global MAC address. The process then terminates as depicted by block 612.

Referring again to block 604, if a determination is made that the server will wake all clients which utilize a particular operating system version, the process passes to block 616 which depicts a creation and transmission of a modified magic packet having a group identifier which identifies a particular operating system version, and a global MAC address. The process then terminates as depicted by block 612.

Referring again to block 606, if a determination is made that the server will wake all clients which are a particular machine type, the process passes to block 618 which depicts a creation and transmission of a modified magic packet having a group identifier which identifies a particular system type, and a global MAC address. The process then terminates as depicted by block 612.

Referring again to block 608, if a determination is made that the server will wake all clients which are utilizing a particular protocol type, the process passes to block 620 which depicts a creation and transmission of a modified magic packet having a group identifier which identifies a particular protocol type, and a global MAC address. The process then terminates as depicted by block 612.

Referring again to block 610, if a determination is made that the server will wake a particular client, the process passes to block 622 which illustrates a creation and transmission of a standard magic packet. The MAC address included within the standard packet is the address of the particular client. The process then terminates as depicted by block 612.

Figure 7:
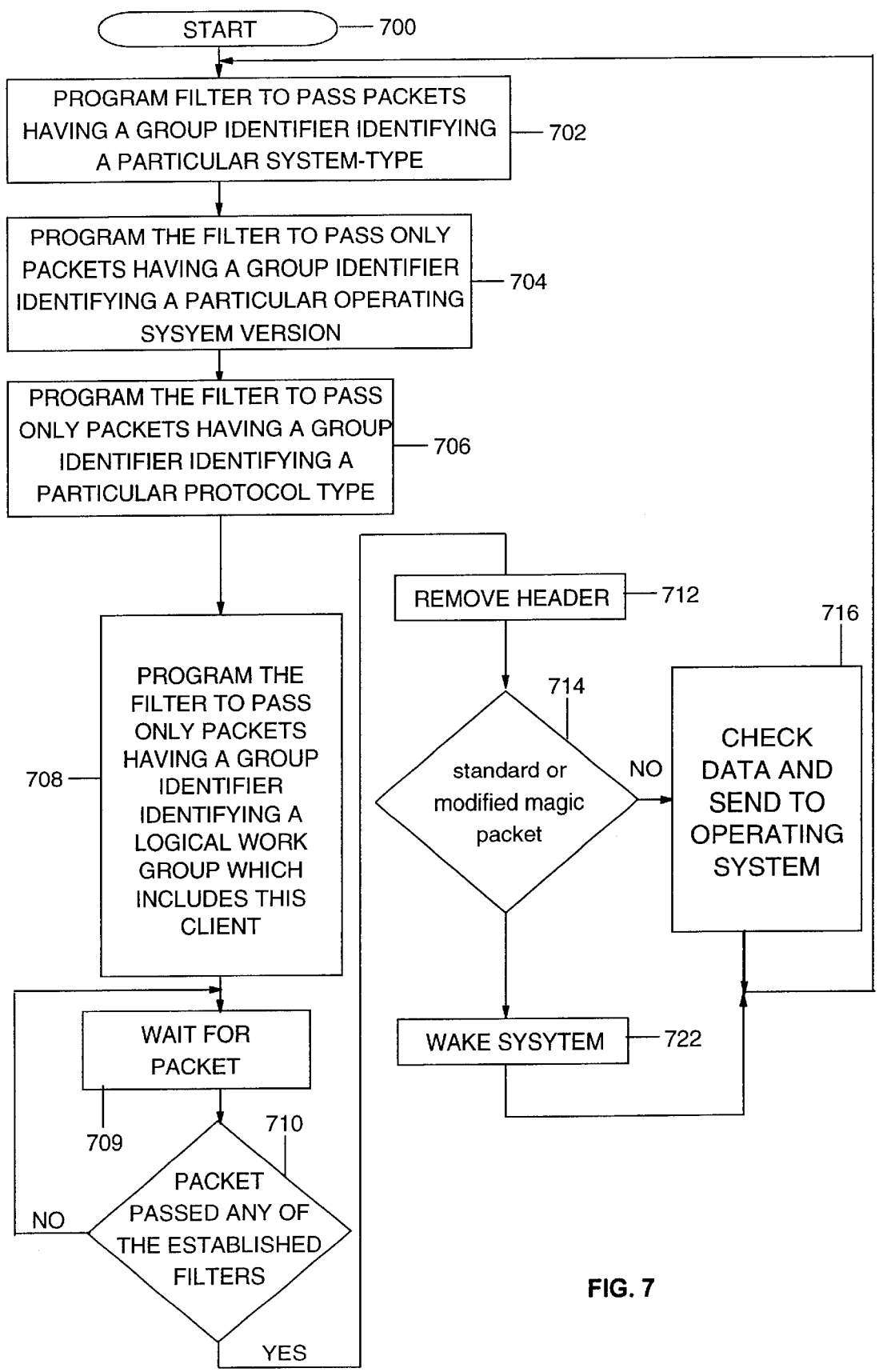
FIG. 7 depicts a high level flow chart which illustrates a client processing a modified magic packet in accordance with the method and system of the present invention.

FIG. 7 depicts a high level flow chart which illustrates a client processing a modified magic packet in accordance with the method and system of the present invention. The process starts as illustrated by block 700 and then passes to block 702 which depicts programming the filter to pass only those packets having a group identifier identifying a particular system-type. Next, block 704 illustrates programming the filter to pass only those packets having a group identifier identifying a particular operating system version. Block 706, then, depicts programming the filter to pass only those packets having a group identifier identifying a particular protocol type. The process then passes to block 708 which illustrates programming the filter to pass only those packets having a group identifier identifying a logical workgroup for the workgroup in which this client is included. Next, block 710 depicts the client waiting for a network packet.

Thereafter, block 712 illustrates the removal of the header from the network packet. Next, block 714 depicts a determination of whether or not the packet is a modified magic packet or a standard magic packet. If a determination is made that the packet is not either a standard or modified magic packet, the process passes to block 716 which illustrates checking the data included within the packet and sending it to the operating system. The process then passes back to block 702.

Referring again to block 714, if a determination is made that the packet is either a standard or modified magic packet, the process passes to block 722 which depicts the client being powered-on, i.e. waking the client. The process then passes back to block 702.

While a preferred embodiment has been particularly shown and described, it will be understood by those skilled in the art that various changes in form and detail may be made therein without departing from the spirit and scope of the present invention.

What is claimed is:

1. A method for efficient communication between a server and only selected client computer system types among a plurality of client computer system types coupled together utilizing a network, said method comprising the steps of:

specifying a logical group identifier which includes only client computer systems of a first operating system among said plurality of client computer system types;

transmitting a network packet throughout said network which includes said logical group identifiers;

filtering said network packet at client computer systems within said network to identify said logical group identifier, and coupling said network packet to only those client computer systems of said first type wherein specific addresses of each client computer system of said first type within said network are not required prior to transmission.

2. The method according to claim 1 wherein said step of specifying a logical group identifier which includes only client computer systems of a first type among said plurality of client computer system types further comprises specifying a logical group identifier which includes only client computer systems utilizing a first network protocol among said plurality of client computer system types.

3. The method according to claim 1 wherein said step of specifying a logical group identifier which includes only client computer systems of a first type among said plurality of client computer system types further comprises the step of specifying a logical group identifier which includes only client computer systems within a first work group among said plurality of client computer system types.

4. The method according to claim 1 wherein said step of filtering said network packet at client computer systems within said network to identify said logical group identifier further comprises the step of providing a network controller including a special purpose processor and a filter to filter said network packet at client computer systems within said network to identify said logical group identifier.

5. The method according to claim 1 wherein said step of transmitting a network packet throughout said network which includes said logical group identifier further comprises the step of generating and transmitting a network packet including a modified magic packet and a data packet, said modified magic packet including a magic packet code identifying said network packet as a magic packet, a global network controller identifier, and said logical group identifier.

6. A data processing system for efficient communication between a server and only selected client computer system types among a plurality of client computer system types coupled together utilizes a network, said system comprising;

a server for specifying a logical group identifier which includes only client computer systems of a first operating system among said plurality of client computer system types;

means for transmitting a network packet throughout said network which includes said logical group identifier;

means for filtering said network packet at client computer systems within said network to identify said logical group identifier; and means for coupling said network packet to only those client computer systems of said first type wherein specific addresses of each client computer system of said first type within said network are not required prior to transmission.

7. The system according to claim 6 wherein said means for specifying a logical group identifier which includes only client computer systems of a first type among said plurality of client computer system types further comprises means for specifying a logical group identifier which includes only client computer systems utilizing a first network protocol among said plurality of client computer system types.

8. The system according to claim 6 wherein said means for specifying a logical group identifier which includes only client computer systems of a first type among said plurality of client computer system types further comprises the means for specifying a logical group identifier which includes only client computer systems within a first work group among said plurality of client computer system types.

9. The system according to claim 6 wherein said means for filtering said network packet at client computer systems within said network to identify said logical group identifier further comprises a network controller including a special purpose processor and a filter to filter said network packet at client computer systems within said network to identify said logical group identifier.

10. The system according to claim 6 wherein said means for transmitting a network packet throughout said network which includes a logical group identifier comprises means for generating a network packet which includes a modified magic packet and a data packet, said modified magic packet including a magic packet code identifying said network packet as a magic packet, a global network controller identifier and said logical group identifier.

* * * * *